United States Patent [19]
Martens

[11] 4,103,247
[45] Jul. 25, 1978

[54] VARIABLE GAIN AMPLIFIERS

[75] Inventor: Jean Victor Martens, Deurne-Antwerp, Belgium

[73] Assignee: International Standard Electric Corporation, New York, N.Y.

[21] Appl. No.: 805,266

[22] Filed: Jun. 10, 1977

[30] Foreign Application Priority Data

Jun. 18, 1976 [NL] Netherlands .................... 7606626

[51] Int. Cl.² .............................................. H03G 3/30
[52] U.S. Cl. .................................. 330/284; 330/291; 330/294; 333/18; 333/28 R
[58] Field of Search ............... 330/104, 112, 145, 254, 330/278, 284, 291, 294; 333/18, 28 R

[56] References Cited

U.S. PATENT DOCUMENTS 3,665,331  5/1972  Wiarda et al. .................... 330/282 X

FOREIGN PATENT DOCUMENTS 1,226,649  10/1966  Fed. Rep. of Germany ....... 330/284

*Primary Examiner*—James B. Mullins
*Attorney, Agent, or Firm*—John T. O'Halloran; Jeffrey P. Morris

[57] ABSTRACT

An automatic equalizer is described including a first transistor to the input of which a cable is coupled and which is branched in common emitter configuration and a second transistor branched in common collector configuration a collector of the first transistor being coupled to the base of the second transistor and the emitters of the transistors being intercoupled through a positive feedback circuit. In variation by small variation of a variable which is substantially independent from active parameters of the transistors results in a gain variation which is independent of the cable length in the lower frequency region and utilizes no coils.

20 Claims, 2 Drawing Figures

VARIABLE GAIN AMPLIFIERS

BACKGROUND OF THE INVENTION

The present invention relates to an automatic active equalizer for a signal pulse transmission cable, said equalizer including at least one amplifier with at least two amplifying devices intercoupled by a feedback circuit, a predetermined closed loop gain versus frequency function of said amplifier being realized by controlling a variable of said function by means of a gain control signal derived from a gain control output of the equalizer. Such an automatic active equalizer is already known from the published French patent application No. 74.11378 and is intended to compensate the distortion and attenuation to which PCM signals are subjected during their transmission over cables. In this known equalizer the feedback circuit ensures negative feedback and comprises a series resonant circuit shunted by a fixed resistance and connected in series with a variable resistance able to be modified by said gain control signal to vary the amount of negative feedback and to realize the wanted gain versus frequency function. To equalize cables having lengths lying between relatively large limits a relatively large variation of the variable resistance is required to perform a correct equalization. For instance, in the known equalizer the variable resistance which is equal to $1/k$ of a fixed value is able to be varied from a value for which $k = 2$ to a value for which $k = 22$ to realize a corresponding variation of the gain which at the peak frequency is proportional to $k$. At zero frequency where the gain variation ideally should be zero, i.e. independent from the cable length, it is proportional to $k/(1+k)$ so that a relatively large variation of the factor $k$ required to have a good discrimination between different cable lengths at the peak frequency gives rise to an appreciable gain variation at low frequencies. Indeed, for the above given value of $k$ the gain variation from high to low frequencies is from 2/3 to 22/23, i.e. 3.1 dB.

SUMMARY OF THE INVENTION

An object of the present invention is to provide an automatic equalizer of the above type wherein a wanted variation of the gain may be obtained by a relatively small variation of the controlled variable.

According to the invention this object is achieved due to the fact that said feedback circuit ensures positive feedback.

In this way a wanted variation of the closed loop gain of the amplifier may be obtained by a small variation of the loop gain thereof.

Another characteristic feature of the present equalizer is that said variable which is constituted by the loop gain of said amplifier is substantially independent from the active parameters of said amplifying devices.

Thus design values of the loop gain close to unity can be accepted without risk of oscillation.

Another characteristic feature of the present equalizer is that said variable is constituted by a controlled factor included in the numerator of said loop gain.

Thus a wanted variation of the closed loop gain may be obtained by a small variation of the controlled factor of the loop gain.

Still another characteristic feature of the present equalizer is that said closed loop gain is equal to $$A = \frac{Z'1(\frac{1}{Z'2} + \frac{1}{Z'4})}{1 - \frac{Z'1}{Z'4}}$$

wherein $Z'1$, $Z'2$ and $Z'4$ are first, second and third functions of first, second, third and fourth impedances and said active parameters, said controlled factor being constituted by said first function, and said fourth impedance being the impedance of said positive feedback circuit.

Another object of the present invention is to provide an automatic equalizer of the above type wherein the closed loop gain variation in the lower frequency region and more particularly at zero frequency is negligible and therefore independent from the cable length.

According to the invention this object is achieved due to the fact that in the lower frequency region said controlled factor is substantially independent from said gain control signal and said third function has an infinite value.

As a consequence, in the lower frequency region the closed loop gain is equal to $Z'1/Z'2$ so that due to the variation of the controlled factor $Z'1$ being small the gain variation for different cable lengths is substantially negligible in this frequency region.

According to a preferred embodiment of the invention the present automatic active equalizer includes a first transistor to the input of which a cable is coupled and which is branched in common emitter configuration and a second transistor branched in common collector configuration, the collector of said first transistor being coupled to the base of said second transistor and the emitters of said transistors being intercoupled through a positive feedback circuit. The collector load of the first transistor includes at least the parallel connection, considered from an AC viewpoint, of a first resistance, a first stray capacitance and the collector-emitter path of a third transistor, the base of which is controlled by a AGC DC signal and is coupled to a tapping point of said first resistance via a second capacitance.

The present invention also relates to an automatic gain control circuit for an amplifier with an output impedance and with an input to which an AC input signal is applied.

This automatic gain control circuit is particularly characterized in that it includes a transistor to the base of which said AC input signal and a DC gain control signal are applied, the collector-emitter path of said transistor being coupled in series with a controlled impedance across at least part of said output impedance, said controlled impedance formed by said collector-emitter path and said controlled impedance is substantially independent from the magnitude of said AC input signal.

The above mentioned and other objects and features of the invention will become more apparent and the invention itself will be best understood by referring to the following description of an embodiment taken in conjunction with the accompanying drawings in which:

DESCRIPTION OF THE PREFERRED EMBODIMENT

The present automatic active equalizer forms part of a repeater (not shown) the input and output of which are coupled through a first and second transformer with a first and a second cable section respectively. The repeater includes the cascaded connection of the above equalizer and a pulse regenerator, and includes further a power supply circuit connected between tappings on the above transformers. The cable is for instance used for the transmission of PCM signal at 8 MHz. The pulse regenerator is used to regenerate the pulses applied to its input in order to permit 0's at 1's to be recognized.

A repeater including an equalizer, a pulse regenerator, a power supply circuit and two transformers is known e.g. from the article "T1C Carrier: The T1 Doubler" by J. F. Graczyk, E. T. Mackey and W. S. Maybach published in Bell Laboratories Record, June 1975, pages 257–263.

Figure 1:
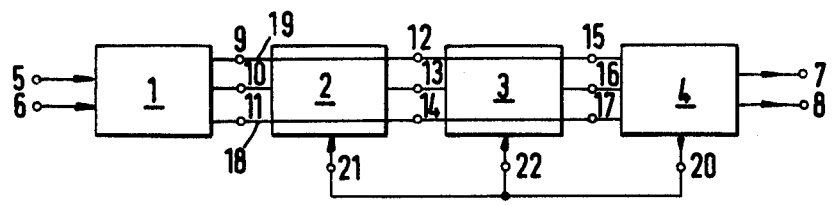
FIG. 1 is a schematic block diagram of an automatic active equalizer according to the present invention.

Referring to FIG. 1 the automatic active equalizer shown therein comprises amplifiers 1, 2, 3 and 4 connected in cascade between input terminals 5, 6 and output terminals 7, 8. The amplifier 1 has input terminals 5, 6 constituting the terminals of the primary winding of the above mentioned first transformer and output terminals 9, 10, 11 which constitute the input terminals of amplifier 2. The latter amplifier 2 has output terminals 12, 13, 14 which constitute the input terminals of amplifier 3 having output terminals 15, 16, 17. The amplifier 4 has input terminals 15, 16, 17, output terminals 7, 8 and an AGC output terminals 20 which is connected to AGC input terminals 21 and 22 of the amplifiers 2 and 3 respectively. The output terminals of the above mentioned power supply circuit (not shown) are connected to a conductor 18 interconnecting the terminals 11, 14, 17 and to a conductor 19 interconnecting the terminals 9, 12, 15 respectively, the conductor 19 being at a voltage of 5 Volts above that of conductor 18. The amplifiers 1, 2 and 3 all have a gain versus frequency characteristic shaped as that of a bandpass filter and the peak of which substantially occurs at a frequency which is somewhat larger than that corresponding to half the PCM bit rate, i.e. 4 MHz. On the contrary, the amplifier 4 has a flat gain versus frequency characteristic and is connected to the regenerator.

Figure 2:
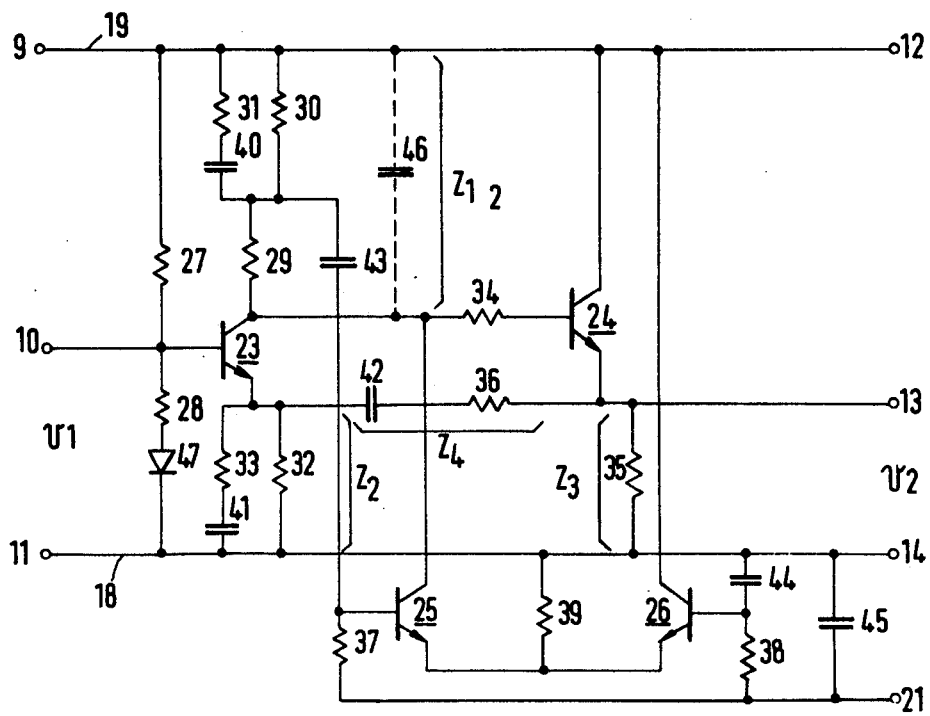
FIG. 2 shows the amplifier 2 of FIG. 1 in more detail.

Referring to FIG. 2, the amplifier 2 represented in detail therein includes NPN transistors 23 to 26, resistors 27 to 39, capacitors 40 to 46 and diode 47. The transistor 23 is connected in common emitter configuration, its base being biased at the potential of the junction point, constituting input terminal 10, of the resistors 27 and 28 which are branched across the conductors 19 and 18 in series with the temperature compensating diode 47. The collector of transistor 23 is connected to the conductor 19 via the series connection of resistor 29 and a parallel circuit the two branches of which are formed by the resistor 30 and the series connection of capacitor 40 and resistor 31 respectively. A parasitic or spurious capacitance 46 is present between the collector of transistor 23 and conductor 19. The emitter of transistor 23 is connected to the conductor 18 via a parallel circuit comprising resistor 32, on the one hand, and the series connection of resistor 33 and capacitor 41, on the other hand. The collector of transistor 23 is further connected via resistor 34 to the base of transistor 24 which is connected in common collector or emitter follower configuration. The collector of transistor 24 is directly connected to the conductor 19, whilst its emitter is connected to conductor 18 through resistor 35. The latter emitter is also connected, on the one hand to the emitter of transistor 23 via a feedback circuit comprising the series connection of resistor 36 and capacitor 42, and on the other hand to output terminal 13.

The above mentioned AGC input terminal 21 is connected to the bases of the transistors 25 and 26 via the resistors 37 and 38 respectively. These bases are further connected to the junction point of the resistors 29 and 30 via capacitor 43 and to the conductor 18 via capacitor 44 respectively. The emitters of the transistors 25 and 26 are connected to conductor 18 via the common resistor 39, whilst their collectors are directly connected to the collector of transistor 23 and to conductor 19 respectively. Finally, a capacitor 45 is branched across conductor 18 and the AGC input terminal 21.

When considering the controlled amplifier 2 of FIG. 2 the following equations may be written:

$$v1 = Z2 (i_e - i) \tag{1}$$

$$v2 = Z3 [i + (1 + b) i_b] = Z2 (i_e - i) - Z4i = -Z1(ai_e + i_b) \tag{2}$$

wherein:

$v1$ and $v2$ are the AC input and output voltage signals of the amplifier 2;

$i_e$ is the emitter current of transistor 23;

$i_b$ is the base current of transistor 24;

$a$ is the common base current transfer ratio of transistor 23;

$b$ is the common emitter current transfer ratio of transistor 24;

$Z1$ is the impedance of the collector load of transistor 23;

$Z2$ is the impedance of the emitter load of transistor 23;

$Z3$ is the impedance of the collector load of transistor 24;

$Z4$ is the impedance of the positive feedback circuit.

The collector load (considered from an AC viewpoint) of transistor 23 is formed by a parallel circuit with:

a first branch comprising the spurious capacitor 46;

a second branch comprising the series connection of resistor 29 and a further parallel circuit with branches formed by the elements 40, 31; 30 and 43, 37, 45;

a third branch comprising the series connection of the collector-emitter path of transistor 25 and resistor 39 which is itself connected in parallel with the collector-emitter path of transistor 26.

From the above equations (1) and (2) one obtains the following equation for the absolute value of the closed loop gain A:

$$A = \frac{v2}{v1} = \frac{Z'1}{Z'2} \cdot \frac{Z'4 + Z'2}{Z'4 - Z'1} = \frac{Z'1(\frac{1}{Z'2} + \frac{1}{Z'4})}{1 - \frac{Z'1}{Z'4}} \tag{3}$$

with $$Z'1 = \frac{(1 + b) Z3Z1}{(1 + b)Z3 + Z1} \tag{4}$$

$$Z'2 = \frac{Z2}{a} \tag{5}$$

$$Z'4 = \frac{Z4}{a - \frac{1}{1 + b}} \tag{6}$$

To be noted that in fact $v1$ and $v2$ have opposite signs.

The closed loop gain versus frequency function has a bandpass filter characteristic exhibiting a peak at the frequency for which $1 - (Z'1/Z'4)$ is minimum. This peak occurs at a frequency beyond 4 MHz which is the frequency corresponding to half the bit rate of the PCM signal and from this maximum on the gain rapidly decreases towards zero so that a considerable part of noise is rejected, as mentioned in the article "30-Channel Pulse Code Modulation System" by J. V. Martens and E. Brading, published in Electrical Communication, Volume 4B, Number 1 and 2, 1973, pp 69–78 and more particularly on page 75 thereof.

The amount to which the design value $Z'4 - Z'1$ can be reduced depends on the possible variations of the transistor parameters. However, from FIG. 2 it follows that the loop gain, i.e. the gain around the feedback loop opened between resistor 36 and the emitter of transistor 24, depends hardly on the transistor parameters because for the feedback signal transistor 23 operates in common base mode and transistor 24 operates as an emitter follower. This is confirmed when calculating this gain. Indeed, the following approximate equations may then be written:

$$v3 = Z2(i_e - i) - (Z + \frac{Z3 \frac{Z1}{b}}{Z3 + \frac{Z1}{b}}) i \qquad (7)$$

$$i_e = i \qquad (8)$$

$$v2 = \frac{Z3 \times Z}{Z3 + Z}(1 + b) i_b = -Z1 (ai_e + i_b) \qquad (9)$$

wherein:

v3 is an input AC voltage signal applied to the opened feedback loop;

v2 is the output AC voltage signal of the amplifier 2 resulting from the application of v3, v1 being short-circuited;

$$\frac{Z3 \frac{Z1}{b}}{Z3 + \frac{Z1}{b}}$$

is the approximate terminating impedance when looking at the left (FIG. 2) in the opened feedback loop;

$$\frac{Z3 \, Z}{Z3 + Z}$$

is the approximate terminating impedance when looking at the right in the opened feedback loop.

From these equations (7), (8), (9) one obtains the following approximate value for the loop gain:

$$\frac{v3}{v1} = \frac{a}{\frac{Z4}{Z'1} + \frac{2}{b} + \frac{Z'1}{(1 + b) bZ4}}$$

so that this loop gain is approximately also equal to $(aZ'1/Z4)$ or $(Z'1/Z'4)$ or $(Z1/Z4)$
because $a$ is close to 1;
$b$ is large;
and Z3 is chosen much larger than Z1 and Z4.

From above it follows that fairly low design values of $1 - (Z'1/Z'4)$ or $1 - (Z1/Z4)$ may be accepted without risk of oscillation.

The operation of the above described equalizer is as follows.

When a distorted and attenuated PCM signal with a bit rate of 8 MHz is supplied to the input 5, 6 of the amplifier 1, it is amplified and filtered therein to provide a first compensation of the attenuation and distortion to which this signal was subjected during its transmission on the cable connected between a preceding repeater and the amplifier 1. Afterwards the output signal of the latter amplifier 1 is fed to the input 10, 11 of the amplifier 2 wherein this signal is also amplified and filtered. The same happens in amplifier 3 the output signal of which is further amplified in amplifier 4, whereafter it is applied to the above mentioned pulse regenerator (not shown). Therein the signal is processed to distinguish between 0's and 1's, as already mentioned above.

To realize a correct gain for all cable lengths — the attenuation being dependent on this length — the gain of the amplifier 2 is modified by varying the above loop gain and more particularly the factor Z1 thereof. This is done by controlling the above mentioned collector load of transistor 23 by means of the AGC DC signal provided at the control output of the amplifier 4. As long as this AGC DC signal is not applied to the control input terminal 21 of the amplifier 2 the transistors 25 and 26 thereof are in the blocked condition so that the fraction of the collector AC voltage of transistor 23, i.e. the fraction appearing across the elements 46; 40, 31; 30 or across 43, 37, 45, applied between the base of transistor 25 and conductor 18 has no effect. However, as soon as an AGC DC signal indicating too high an equalizer gain is supplied to the control terminal 21 both the transistors 25 and 26 become conductive. From that moment on the AC collector - emitter AC impedance of the transistor 25 is modified in function of the AGC signal applied to its base and as a consequence also the above mentioned collector load with impedance Z1 of this transistor 23 is modified.

More particularly, the control by the AGC DC signal of the impedance Z1 and therefore of the value Z'1 is performed in such a way that for each frequency the loop gain Z'1/Z'4 varies from a value equal to about 1/1.1 (or about 0.9) to 1/1.4 (or about 0.7). From the relation (3) it follows that the corresponding closed loop gain variation is then equal to 4 (12 decibel). To be noted that this gain variation is obtained by a small variation of Z'1 i.e. from 0.9 Z'4 to 0.7 Z'4. Instead of controlling the value of Z'1 it is clear that also the value of Z'4 or both could be varied by the AGC signal.

At zero frequency the above absolute value of the gain expressed in relation (3) becomes equal to $$A = (v2/v1) = (Z'1/Z'2) = (R29 = R30)/R32$$

because Z'4 is then infinite. This value is independent from the gain control and therefore from the cable length so that the gain variation at zero frequency is zero. This is correct since from a DC viewpoint the cable loss is very small for the lengths of cable interconnecting repeaters i.e. 2 to 3 kilometers.

As first described, the value of the impedance Z1 is varied by varying the collector-emitter AC impedance of the transistor 25 in function of the AGC DC signal applied to the base of this transistor. However, if no precautions were taken this collector-emitter AC impedance would also vary in function of the amplitude of the AC signal applied to the transistor 25. To avoid this, use is made of the transistor 26 which from an AC viewpoint is branched in parallel with the resistor 39 and the base of which is coupled to one end of resistor 30 to the other end of which the base of transistor 25 is connected. Indeed, when the AC signal applied to transistor 25 increases the emitter current thereof increases, whereas the emitter current of transistor 26 decreases. As a consequence the corresponding decrease of the internal emitter impedance of transistor 25 is substantially compensated by the corresponding increase of the internal emitter impedance of transistor 26, the latter impedance being much smaller than the resistance value of resistor 39. An analogous operation occurs when the AC signal decreases.

To be noted that if the connection between the tapping point of the resistors 29, 30 and the base of transistor 25 were opened so that no AC signal could be applied thereto, the collector-emitter impedance of this transistor would constitute an infinite AC impedance. Indeed, when fed by a constant base current the collector current of this transistor is necessarily constant.

The capacitor 43 of 220 pico-Farads which is connected in series with resistor 37 having a resistance of 5,100 ohms and which is used to apply the AC signal to transistor 25 is also used to decrease the gain variation in the lower frequency region of the spectrum, i.e. in a region at 5% from the frequency of 4 MHz corresponding to half the bit rate. Indeed, the value of this capacitor has been chosen in such a way that it presents a high impedance in this frequency region. Thus the impedance of the collector load of transistor 23 is increased whilst the gain is increased and therefore the gain variation is decreased. The effect of capacitor 43 may also be appreciated by remarking that the higher is its impedance the smaller is the influence of the AGC control.

Although not absolutely necessary the elements 31, 40 and 33, 42 have been used to further correct the gain versus frequency characteristic.

The purpose of the capacitor 40 of 1200 pico-Farads which is connected in series with resistor 31 having a resistance of 39 ohms is to decrease the gain variation in the higher frequency region of the spectrum by decreasing the gain in this region. The aim of the capacitor 41 of 1500 pico-Farads which is connected in series with a resistance of 300 ohms is to increase the gain in the lower frequency region.

In connection with the above it should be pointed out that the equalizer described is such that the overall gain (represented in a linear scale) versus frequency characteristic measured between the beginning of a cable connected to the repeater preceeding the equalizer and the regenerator following the equalizer has a horizontal portion followed by a decreasing portion constituted by a so-called raised cosine having an inflection point the ordinate value of which is equal to half the maximum gain and the abcissa value of which is equal to half the bitrate i.e. 4 MHz. This means that the gain (in dB) versus frequency characteristic of the equalizer increases in the frequency region extending towards the half bit rate to compensate for the cable attenuation, but afterwards rapidly decays beyond this half bit rate, and that in the lower frequency region the gain versus frequency characteristics for various cables have proportional ordinates in the last mentioned region. Such a proportionality does not exist in the above discussed French patent application 74.11378, as follows clearly from FIG. 3 thereof.

While the principles of the invention have been described above in connection with specific apparatus, it is to be clearly understood that this description is made only by way of example and not as a limitation on the scope of the invention.

I claim:

1. Automatic active equalizer for a signal pulse transmission cable, said equalizer including:
   at least one amplifier means including at least two amplifying devices;
   feedback circuit means for intercoupling said amplifying devices, said amplifier having a predetermined closed loop gain versus frequency function;
   a gain control output;
   means for controlling a variable of said function with a gain control signal derived from said gain control output of said equalizer such that said feedback circuit provides positive feedback.

2. Automatic active equalizer according to claim 1, wherein said variable includes the loop gain of said amplifier said loop gain being substantially independent from the active parameters of said amplifying devices.

3. Automatic active equalizer according to claim 2, wherein said variable includes a controlled factor included in the numerator of said loop gain.

4. Automatic active equalizer according to claim 3, wherein said controlled factor is controlled by said gain control signal provided at said gain control output of the equalizer when the magnitude of the output signal of said equalizer exceeds a predetermined value due to the gain of the equalizer exceeding a predetermined value.

5. Automatic active equalizer according to claim 3, wherein said closed loop gain is equal to $$A = \frac{Z'1(\frac{1}{Z'2} + \frac{1}{Z'4})}{1 - \frac{Z'1}{Z'4}}$$

wherein Z'1, Z'2 and Z'4 are first, second and third functions of first (Z1), second (Z2), third (Z3) and fourth (Z4) impedances and said active parameters, said controlled factor being constituted by said first function (Z'1) and said fourth impedance (Z4) being the impedance of said positive feedback circuit.

6. Automatic active equalizer according to claim 5, wherein in the lower frequency region said controlled factor is substantially independent from said gain control signal and said third function has an infinite value.

7. Automatic active equalizer according to claim 5, wherein said impedances are comprised of resistors and capacitors.

8. Automatic active equalizer according to claim 4, wherein said amplifier includes:
   a first transistor to the input of which said cable is coupled and which is configured in common emitter configuration;
   a second transistor configured in common collector configuration;
   a first output electrode means including the collector of said first transistor, said output means being coupled to an input electrode means including the base of said second transistor and second electrode means including the emitters of said first and second transistors being intercoupled through said positive feedback circuit such that:

$$Z'1 = \frac{(1 + b) Z3Z1}{(1 + b) Z3 + Z1}$$

-continued $$Z'2 = \frac{Z2}{a}$$

$$Z'4 = \frac{Z4}{n - \frac{1}{1+b}}$$

wherein Z1 and Z2 are said first and second impedances of the loads connected to said first output electrode means of said first transistor and to said second electrode means, said first impedance being controlled by said gain control signal and wherein Z3 is said third impedance of the load connected to the second electrode means of said second transistor, a being the common base current transfer ratio of said first transistor and b being the common emitter current transfer ratio of said second transistor.

9. Automatic active equalizer according to claim 8, wherein said first impedance includes:
at least the parallel ac connection, of a first resistance, a first capacitance and the series connection of the collector-emitter path of a third transistor and a second resistance, the base of said third transistor being controlled by said gain control signal and being coupled to a tapping point of said first resistance via a second capacitance.

10. Automatic active equalizer according to claim 9, wherein said first capacitance is a stray capacitance.

11. Automatic active equalizer according to claim 9, wherein said second resistance is configured in parallel with the collector-emitter path of a fourth transistor, the base of which is also controlled by said gain control signal and is coupled via a third capacitance and through part of said first resistance to said tapping point.

12. Automatic active equalizer according to claim 11, wherein the series connection of said collector-emitter path of said fourth transistor and said second resistance is coupled between first and second poles of a DC source, the base of said fourth transistor being connected to said second pole via said third capacitance.

13. Automatic active equalizer according to claim 11, wherein said gain control output of said equalizer is coupled to one of the poles of a pair of poles of a DC source via a fourth capacitance and to the bases of said third and fourth transistors via a third and a fourth resistance respectively, the series connection of said second capacitance, said third resistance and said fourth capacitance also forming part of said first impedance.

14. Automatic active equalizer according to claim 11 wherein said first impedance also includes the series connection of a fifth resistance and a fifth capacitor said series connection being configured between said tapping point and said first pole.

15. Automatic active equalizer according to claim 9, wherein said first output electrode means of said first transistor and said second electrode means are coupled to the first and second poles of a DC source via said first and second impedances, and that the series connection of said collector-emitter path of said third transistor and said second is coupled between said first output electrode of said first transistor and said second pole.

16. Automatic active equalizer according to claim 15, wherein said first impedance also includes the series connection of a fifth resistance and a fifth capacitor said series connection being configured between said tapping point and said first pole.

17. Automatic active equalizer according to claim 8, wherein said second impedance connected to the second electrode means of said first transistor comprises the series connection of a resistance and a capacitor.

18. Automatic gain control circuit for an amplifier having an output impedance and having an input to which an AC input signal is applied, said control circuit including:
transistor means having said AC input signal and a DC gain control signal applied to the base thereof;
controlled impedance means coupled in series with the collector-emitter path of said transistor across at least part of said output impedance such that said controlled impedance is controlled in such a manner that the total impedance formed by said collector-emitter path and said controlled impedance is substantially independent from the magnitude of said AC input signal.

19. Automatic gain control circuit according to claim 18, wherein for said AC signal, said controlled impedance includes:
the parallel connection of the collector-emitter path of a second transistor and a resistance, and the base electrodes of said first and second transistors being coupled via a portion of said output impedance, and wherein that output electrodes of said first and second transistors are connected, and wherein said DC gain control signal is coupled to the base of said second transistor.

20. Automatic active equalizer for a signal pulse transmission cable, said equalizer including:
at least one amplifier means including at least two amplifying devices;
feedback circuit means for intercoupling said amplifying devices, said amplifier having a predetermined closed loop gain versus frequency function, said feedback circuit including a resistance and a capacitance connected in series;
a gain control output;
means for controlling a variable of said function with a gain control signal derived from said gain control output of said equalizer such that said feedback circuit provides positive feedback.

* * * * *